F. D. MARTIN.
TOOTH GAGE DEVICE FOR CIRCULAR SAWS.
APPLICATION FILED JAN. 13, 1917.

1,240,074.

Patented Sept. 11, 1917.
2 SHEETS—SHEET 1.

Inventor,
Frank D. Martin
By C. F. Belk
Attorney

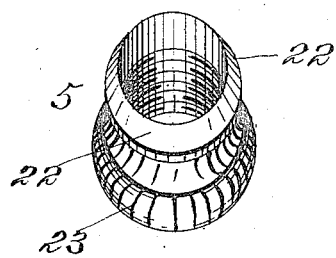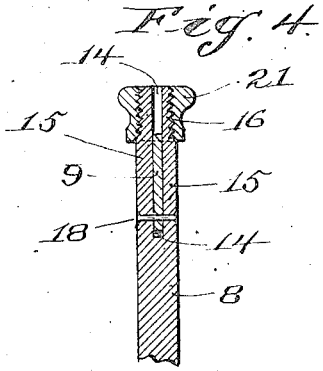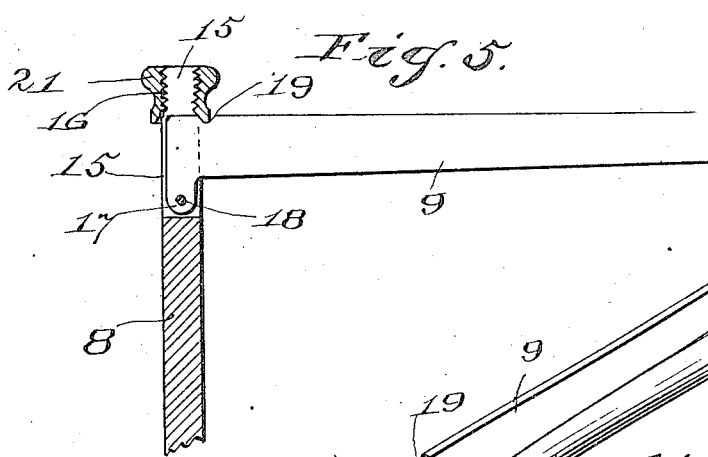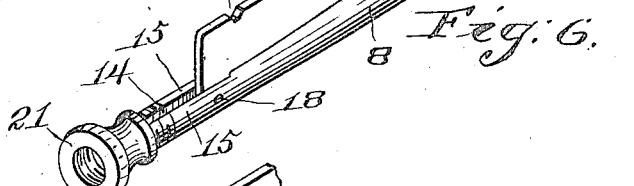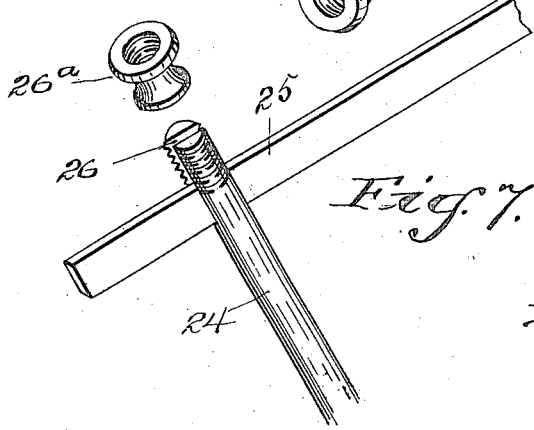

UNITED STATES PATENT OFFICE.

FRANK D. MARTIN, OF CHESTER, VERMONT.

TOOTH-GAGE DEVICE FOR CIRCULAR SAWS.

1,240,074. Specification of Letters Patent. Patented Sept. 11, 1917.

Application filed January 13, 1917. Serial No. 142,232.

*To all whom it may concern:*

Be it known that I, FRANK D. MARTIN, a citizen of the United States, residing at Chester, in the county of Windsor and State of Vermont, have invented certain new and useful Improvements in Tooth-Gage Devices for Circular Saws, of which the following is a specification.

This invention relates to tooth gages for circular saws, and pertains especially to a device for determining uniform shape and pitch of circular saw teeth preparatory to making, shaping, forming, regrinding, or filing the teeth.

The object of the invention is to provide an implement or device applicable to circular saws of various size and having various size saw-mandrel or shaft holes, for determining desired uniform shape and pitch of the saw teeth preparatory to forming new teeth, and for renewing or refiling old teeth.

A further object of the invention is to provide a device adapted to fit the mandrel or shaft hole of saws of various size having various size central holes, and a radially adjustable rod having a scribing rule or straight edge perpendicular to the rod, and adapted to be used upon various size saws for scribing saw teeth positions.

A still further object of the invention is to provide a scriber arm and rod adapted to be folded, and a locking device for holding the arm in fixed position with respect to the rod.

In the accompanying drawings forming part of this application:—

Figure 1:
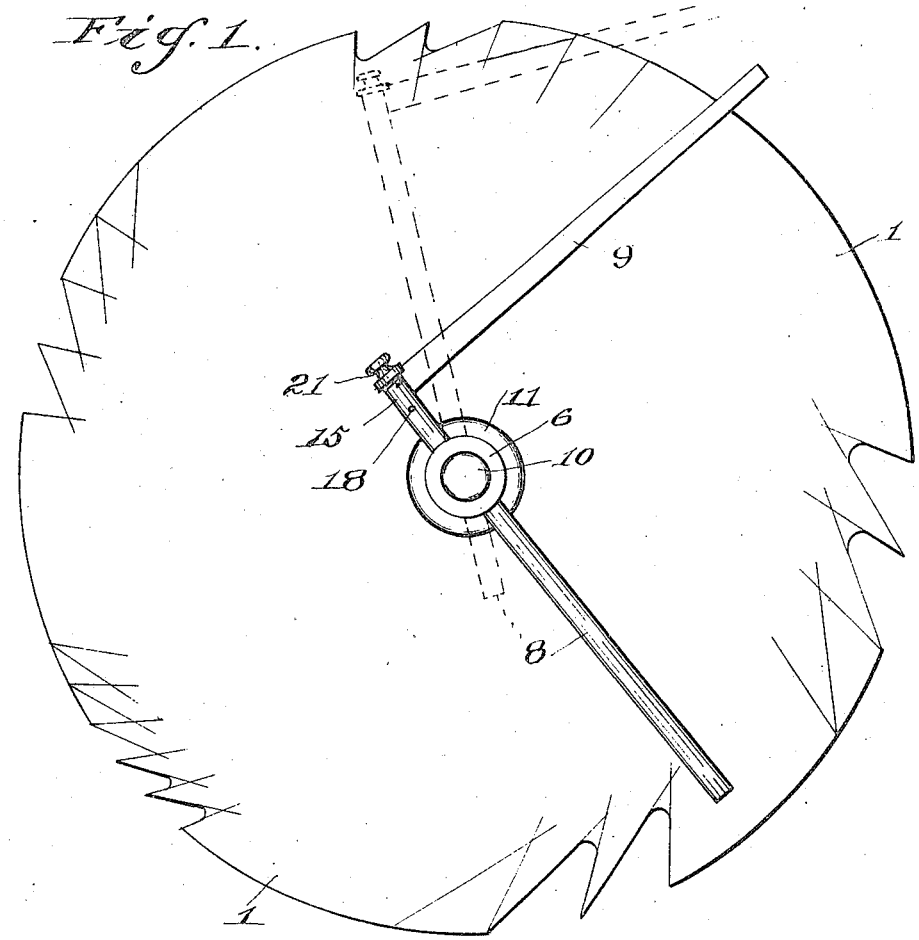

Figure 1 is a face view of a circular saw blank in position for scribing, showing the application of the invention thereto.

Figure 2:
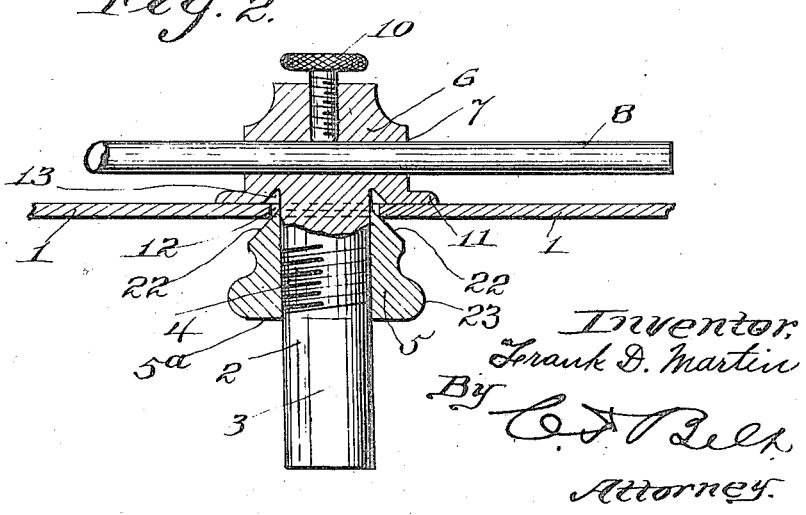

Fig. 2 is a sectional view of the device applied to a saw, the latter and the arm and rod being broken away.

Fig. 3 is a perspective view of the centralizing nut.

Fig. 4 is a detail sectional view of the joining ends of the rod and of the arm in open position.

Fig. 5 is a sectional elevation of the joining ends in open position.

Fig. 6 is a perspective view of the joining ends of the rod and of the arm in folded position.

Fig. 7 is a perspective view showing a modification of the rod and arm joint.

The same reference characters denote the same parts throughout the several views of the drawings.

In carrying out my invention and applying it to circular saws for predetermining proper position and uniform shape of the saw teeth, I employ a device adapted to be held by a suitable vise or its equivalent with a circular saw blank as 1, revolubly held by said device, which embodies a post 2, having flattened faces 3 for convenience in clamping, and having a screw-threaded portion 4, and a cone nut 5, hereinafter more particularly referred to. The device further embodies a post head 6 having a transverse hole 7 for a rod 8, carrying a scriber arm 9, a thumb-screw 10, working through the head at right angles to the hole 7, for adjustably securing the rod to the head, and an annular head flange 11 for engaging the face of a saw adjacent the central saw hole 12. The under face of the flange 11 has an annular groove 13 at the intersection of the head and the post, the purpose of which will be hereinafter explained.

The rod 8 and the arm 9 have special joining ends for permitting the arm to be folded upon the rod, when not in use, and to permit the arm to be unfolded and placed at right angles to the rod without detaching or separating these parts. To accomplish these results the free end of the rod 8 has a slot 14 dividing this end of the rod into two members 15, having a screw-threaded portion 16, hereinafter more particularly referred to. The end of the arm 9 which fits the slot 14 has an ear 17 projecting from the inner edge of the arm and is pivoted to and between the member 15, by a pivot pin 18, and the outer edge of the arm has a notch 19 and a beveled corner 20. The notch is spaced apart from the beveled corner so as to be engaged by the bottom edge of a locking nut 21, when the latter is screwed upon the members 15, for locking the arm at right angles to the rod preparatory for scribing. Obviously the nut or thumb screw 21, needs only to be unscrewed enough to permit pivot movement of the arm for folding, as shown in Fig. 6 of the drawings.

In order to centralize saws, having various size center holes, with respect to the post head, which is highly important for perfecting uniform tooth scribing, I provide the centralizing cone nut 5 with an annular beveled top end 22 adapted to fit central saw holes of various sizes, and also adapted to fit the post groove 13. The other end of the nut 5 has a bearing face 5ª adapted to form a vise rest when the post is clamped therein, and the face 5ª has a milled periphery 23, for convenience in turning the nut on the screw portion 4 of the post.

In assembling and operating the device, the post is inserted through the saw hole, the nut 5 is screwed into position so as to centralize and hold the saw against the head flange, while the post is clamped in a vise or other suitable device for holding the post in vertical position. Obviously the saw rests upon the beveled end of the cone nut and is centralized with respect to the post by operating the cone nut so that the beveled end thereof will make central adjustment of the saw thereon, and also permit the saw to be turned or revolved for successive tooth scribing while the post is in fixed position. Then the rod 8 is adjusted in the head 6 so as to place the outer or straight edge of the arm 9 in such position, relative to the periphery of the saw, as may be desired for fixing the points or the pitch of the teeth. From these points the under or short edges of the teeth are scribed. Then the rod is extended so as to place the arm in desired position for scribing the other edge of the teeth from said points, as clearly shown in dotted lines in Fig. 1 of the drawings. Obviously the saw is given rotary movement at intervals between said scribings until the full complement of teeth is scribed throughout the periphery of the saw.

Referring to the modification shown in Fig. 7, the rod 24 and the arm 25 are connected together so that the arm may be adjusted in the rod slot 26 to various scribing lengths, by means of a thumb screw 26ª. Obviously the rod and the arm may have other equivalent connections, or they may be made in one piece.

It will be seen that the device may be expeditiously applied and operated for tooth scribing on either side of a saw uniformly, and that the parts may be quickly assembled and disassembled without employing tools or implements of any kind in connection therewith.

I do not wish to confine the parts to any particular material, size or dimensions, neither do I wish to limit the invention in its application to any particular size or character of circular saws, but reserve the right to make such changes and variations in the invention and in its application as may come within the scope of the appended claims.

Having thus described my invention what I claim as new and desire to secure by Letters Patent is:—

1. A tooth gage device for circular saws, comprising a flanged head having a transverse hole and a set screw hole perpendicular to the transverse hole, a saw mandrel projecting from the flanged end of the head, a rod adjustable in the transverse hole, a scriber arm projecting at right angles from the rod, and a set screw working in the set screw hole for adjustably securing the rod in the transverse hole.

2. A tooth gage device for circular saws, comprising a head having a saw mandrel, a nut for centralizing the saw upon the mandrel and having a seat upon which the saw is revolved for scribing, and a scriber arm adjustably connected with the head.

3. In a device of the character described, a head having a screw threaded mandrel projecting therefrom, a cone-shaped nut for the screw portion of the mandrel and adapted to fit the mandrel hole of a saw for centralizing the saw and permitting revolution of the saw, a rod adjustable in the head, and a scriber arm foldably connected with the rod.

4. In a device of the character described, a countersunk head having a mandrel for circular saws, a flange extending from the countersunk portion of the head for engaging one face of the saw, a nut fitting the mandrel on the other face of the saw and having a cone-shaped end extending through the mandrel hole of a saw and fitting the countersunk portion.

5. The combination of a scriber arm, a rod provided with a screw threaded end and having the arm pivoted in the screw threaded end, and a nut operated on said rod end and engaging the arm for holding the arm at right angles to the rod.

6. The combination of a scriber arm having an ear, a rod having a slotted screw threaded end, in which the ear is pivoted, and a nut operated over the slot for locking the arm perpendicular to the rod.

In witness whereof I hereunto set my hand in the presence of two witnesses.

FRANK D. MARTIN.

Witnesses:
 HUGH HENRY,
 ALICE A. HENRY.